United States Patent
Wuerth et al.

[11] Patent Number: 6,052,641
[45] Date of Patent: Apr. 18, 2000

[54] SYSTEM FOR ACTUATING A BRAKE SYSTEM

[75] Inventors: Gebhard Wuerth, Sulzbach-Laufen; Elmar Mueller, Markgroeningen; Ruediger Poggenburg, Vaihingen; Bernd Grossardt, Boennigheim; Eberhard Sonntag, Oberriexingen, all of Germany

[73] Assignee: Robert Bosch GmbH, Stuttgart, Germany

[21] Appl. No.: 08/807,908

[22] Filed: Feb. 27, 1997

[30] Foreign Application Priority Data

Mar. 23, 1996 [DE] Germany .................. 196 11 491

[51] Int. Cl.$^7$ ........................................ G06F 7/70
[52] U.S. Cl. .................. 701/70; 701/71; 701/72; 701/78
[58] Field of Search ................ 701/70, 71, 72, 701/78

[56] References Cited

U.S. PATENT DOCUMENTS

| | | | |
|---|---|---|---|
| 5,229,944 | 7/1993 | Yasuno | 701/70 |
| 5,474,369 | 12/1995 | Inagaki et al. | 701/70 |
| 5,579,230 | 11/1996 | Lin et al. | 701/70 |
| 5,711,023 | 1/1998 | Eckert et al. | 701/70 |
| 5,809,444 | 9/1998 | Hadeler et al. | 701/72 |
| 5,832,402 | 11/1998 | Brachert et al. | 701/72 |

FOREIGN PATENT DOCUMENTS

| | | |
|---|---|---|
| 2296547 | 7/1996 | United Kingdom. |
| 2296790 | 7/1996 | United Kingdom. |
| 2296791 | 7/1996 | United Kingdom. |

OTHER PUBLICATIONS

Bosch Technische Berichte 7 (1980) pp. 78–82.
van Zanten et al., "VDC, The Vehicle Dynamics Control System of Bosch" SAE Technical Paper No. 950759 (1995).

*Primary Examiner*—William A. Cuchlinski, Jr.
*Assistant Examiner*—Olga Hernandez
*Attorney, Agent, or Firm*—Fulbright & Jaworski, LLP

[57] ABSTRACT

An instability value for at least one wheel is derived from the detected variables such as rotational velocity of the wheels, and as a function of this instability value, the brake systems are actuated to change the brake pressure, such that in addition, the present invention can calculate a variable which modifies or represents the driving dynamics of the vehicle and wherein the instability value can be modified as a function of the calculated driving dynamics variable.

14 Claims, 7 Drawing Sheets

| CYCLE | 1 | 2 | 3 | 4 | 5 |
|---|---|---|---|---|---|
| $\overline{ISS_{akt}}$ / $ISS_{start}$ | 1 | 0.7 | 0.5 | 0.3 | 0.0 |
| dP/P100 | 0.4 | 0.28 | 0.20 | 0.12 | 0.0 |

SYSTEM FOR ACTUATING A BRAKE SYSTEM

BACKGROUND OF THE INVENTION

The invention proceeds from a system for actuating the brake systems of at least one wheel of a vehicle, which system detects at least one variable representing movement of a wheel, generates an instability value based on detected variables, and changes the brake pressure as a function of the instability value.

Brake systems of this type include antilock control systems, which exist in many different forms. For example, reference can be made here to the document Bosch Technische Berichte, Vol. 7, No. 2, 1980. In antilock control systems of this type, the brake systems of the wheels of the vehicle are actuated in such a way that a change in the brake pressure occurs as a function of an instability value. This instability value is generated as a function of the detected motion of the wheel, usually its rotational velocity. In particular, this instability value is a combination of the instantaneous deceleration or acceleration of the periphery of the wheel and the brake slip.

Systems for controlling the dynamics of vehicle motion are also known, in which a variable which modifies and/or represents the dynamics of the vehicle's motion such as, for example, the angular yaw acceleration, the steering angle, and/or the transverse acceleration of the vehicle, is detected. As a function of these measured variables, the brake systems of the wheels are actuated so as to increase the driving stability. A system such as this is known from, for example, the article "VDC, The Vehicle Dynamics Control System of Bosch", Advancements in ABS/TCS and Brake Technology (1995).

DE 44 46 592.0 discloses a modularly designed driving dynamics control system in which an overriding vehicle dynamics controller intervenes in a subordinate antilock control system to increase the driving stability. DE 44 46 592 corresponds to U.S. application Ser. No. 08/576,962 filed Jan. 22, 1995 and incorporated herein by reference.

The object of the present invention is to modify a known antilock controller for the purpose of increasing the driving stability.

SUMMARY OF THE INVENTION

As already mentioned, the invention is based on a system for actuating the brake systems of at least one of the wheels of a vehicle. Detection means are provided to detect at least one variable representing the motions of the wheels. For this purpose, the rotational velocity of the wheel is usually determined. From the detected variables, an instability value for at least one wheel is derived. The brake systems are then actuated to change the brake pressure as a function of this instability value.

Calculation means are provided to calculate a variable which modifies and/or represents the driving dynamics of the vehicle; the instability value can be modified as a function of this calculated driving dynamics variable. The extent or the magnitude of the instability value in and of itself, that is, without the modification of it according to the invention, provides a measure of the stability of the wheel in question. This can mean, for example, that the unmodified instability value indicates whether or not the associated wheel is locking or showing a tendency to lock. The driving dynamics variable describes the vehicle behavior associated with the dynamics of the wheels (for example, the lateral guiding force). The invention offers the advantage that the antilock control system and the driving dynamics control system can be used independently of each other. In particular, it is not necessary to modify an already existing, application of a subordinate antilock control system. In particular, the system according to the invention makes it possible to achieve a higher level of development of both the subordinate antilock control system and the overriding driving dynamics control system independently of each other.

In an advantageous embodiment of the invention, it is provided that at least two wheel dynamics values derived from the detected wheel motion variables are calculated to generate the instability value. To modify the instability value, one of these wheel dynamics values is then modified as a function of the calculated driving dynamics variable. In this embodiment, it is intended in particular that the wheel slip, especially the brake slip of the wheel, is determined as a wheel dynamics value. This wheel slip is then modified as a function of the driving dynamics variable. As an additional wheel dynamics value, the deceleration of the wheel can also be used to help form the instability value.

In another embodiment of the invention, it is provided that, as a result of the modification of the instability value belonging to a wheel, the brake pressure at this wheel is increased, even though the wheel may have locked or is showing a tendency to lock. As a result, the overriding driving dynamics controller subjects the wheel to a controlled overbraking.

As a result of the modification of the instability value belonging to a wheel, it is further possible for the brake pressure at this wheel to be lowered from a higher pressure level to a lower pressure level, even though the wheel has not locked and is not showing any tendency to lock. In this case, the overriding driving dynamics controller subjects the wheel to a controlled underbraking.

It is especially advantageous that, in cases where the instability value is modified, the gradient of the change in the brake pressure is selected differently from cases where the instability value is not modified. This means that, in cases where the overriding driving dynamics controller changes the brake pressure, this change in the brake pressure occurs with a different gradient than the one used to the change the pressure in the case of a normal antilock control process. It is provided in particular that, in cases where a change in the brake pressure occurs through a modification of the instability value, the gradient of the change in brake pressure is selected as a function of the degree to which the instability value is modified. This has the effect that, in general, the more unstable the driving behavior of the vehicle, the greater the modification of the instability value. If, for example, the driving stability of the entire vehicle is significantly at risk, then the change in the brake pressure should also occur as quickly as possible, that is, with a steep gradient, as a result of the modification of the instability value according to the invention.

After a change in the brake pressure, especially a pressure reduction (underbraking), has occurred as a result of the modification according to the invention of the instability value, another variant of the invention includes the following pressure buildup. In this case, the overriding driving dynamics controller will have to interrupt its underbraking intervention. In addition, the wheel brake pressure must be brought back to the normal locking pressure level. This is done by building the pressure back up after the pressure reduction as a function of the instability value currently being generated and/or as a function of the instability value generated at the beginning of the modification of the instability value and/or as a function of the difference between the higher pressure level and the lower pressure level. In this way, the pressure is returned in an advantageous manner to the locking level of the subordinate antilock controller corresponding to the current operating conditions.

The brake pressure changes can be carried out in stages by means of pre-selectable pressure buildup and/or pressure release pulses separated by preselectable pressure hold phases. In and of itself, a so-called "pulse level control" such as this is state of the art (see Bosch Technische Berichte cited above). The object of the variant of the invention described here is to vary the gradient of the brake pressure changes by adapting the pressure hold phases to the driving dynamics variable.

For this purpose, at least one threshold value is also calculated in addition to the driving dynamics variable mentioned above. The pressure hold phases are then specified as a function of the extent of the deviation between the calculated threshold value and the calculated driving dynamics variable. In this way, the brake pressure gradient is easily adapted to the driving dynamics situation prevailing at the time.

DETAILED DESCRIPTION OF THE PREFERRED EMBODIMENTS

Figure 1:
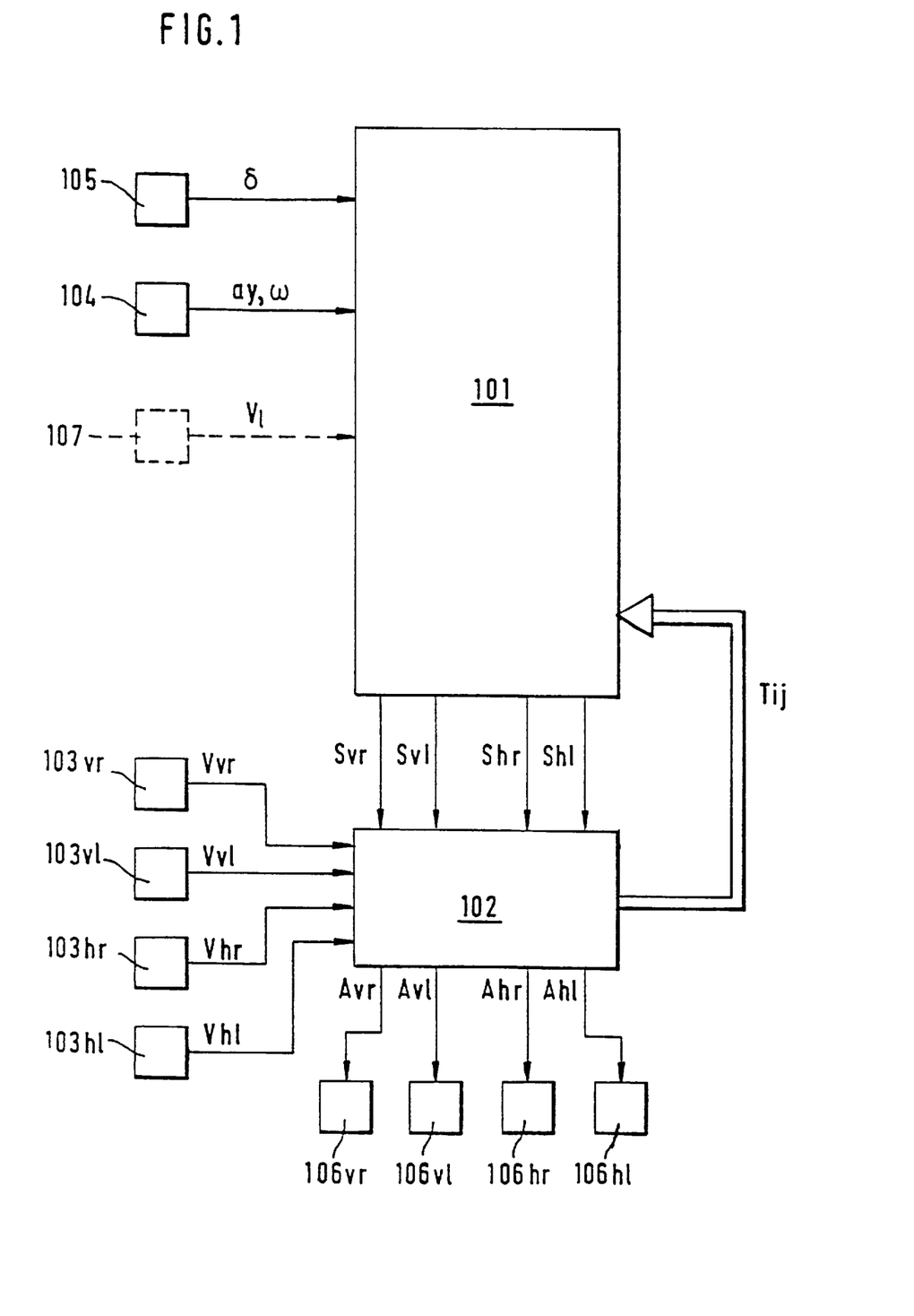
FIG. 1 is an overall block diagram which reflects the state of the art.

FIG. 1 shows the structure of a driving dynamics control system according to DE 44 46 592.0 cited above. Reference numbers 101 and 102 indicate two controller components. The signals δ of a steering angle sensor 105 are sent to controller component 101, which is the overriding driving dynamics controller. In addition, signals ay from a transverse acceleration sensor and u from an angular yaw velocity sensor 104 are also sent to overriding driving dynamics controller 101. The angular velocity of the vehicle around its vertical axis is detected as the angular yaw velocity ω. In addition, the longitudinal velocity $V_1$ of the vehicle from detectors 107 is also sent to overriding driving dynamics controller 101. Detectors 107 are usually designed so that the vehicle's longitudinal velocity is derived in a manner known in and of itself from the individual rotational speeds of the wheels. Overriding driving dynamics controller 101 forms actuation signals $S_{ij}$ for the individual wheel brakes in such a way that the driving behavior becomes as stable as possible. Index "i" designates here whether the wheel brake belongs to the rear or front axle, whereas the index "j" indicates whether the brake is on the right or left side of the vehicle. The variable 'I' can be substituted by the 'h' (rear) or 'v' (front) and the variable 'j' can be substituted by the 'r' (right) or 'l' (left).

Figure 4A:
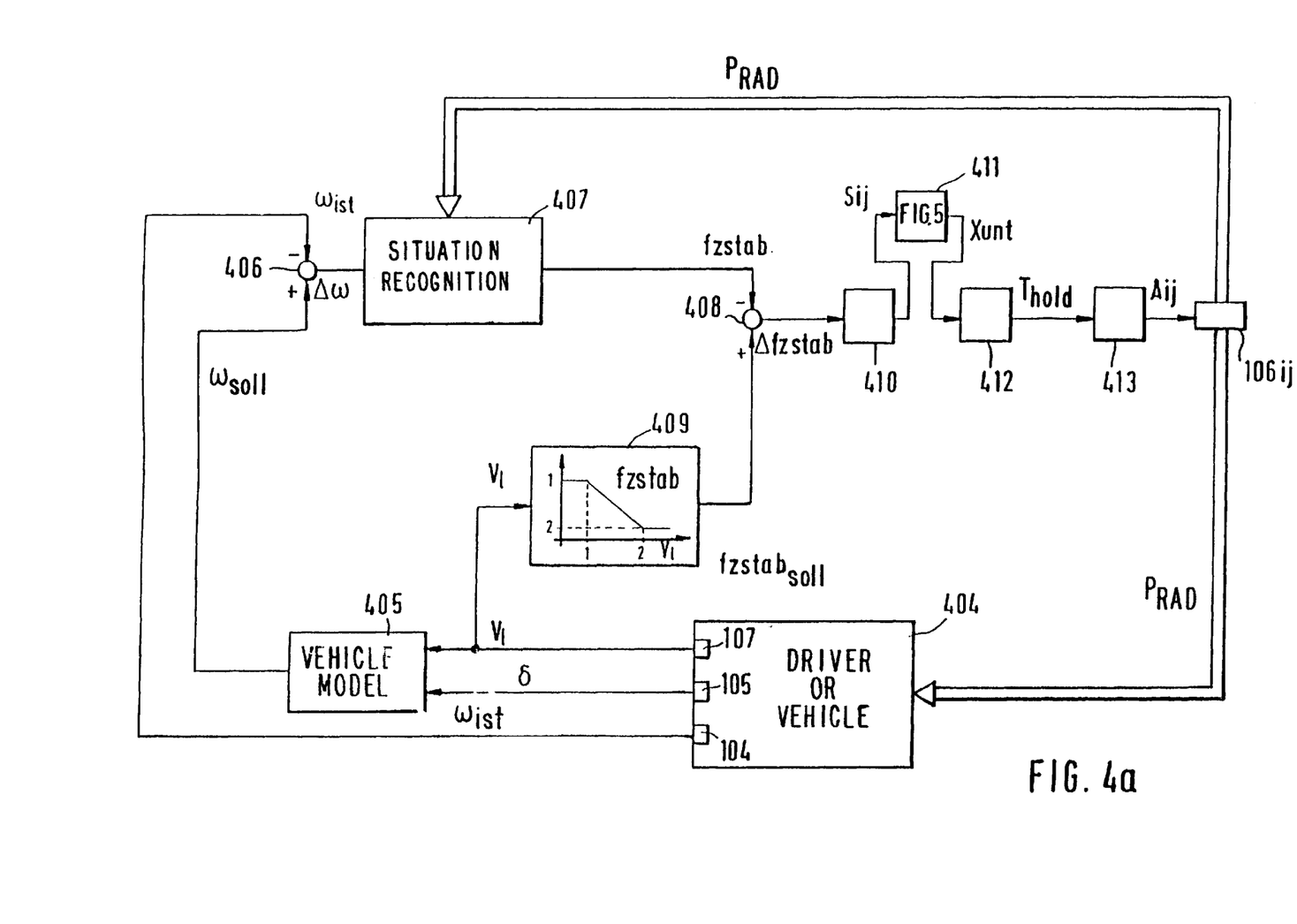
FIGS. 4a and 4b show specific forms of an exemplary embodiment.
Figure 4B:
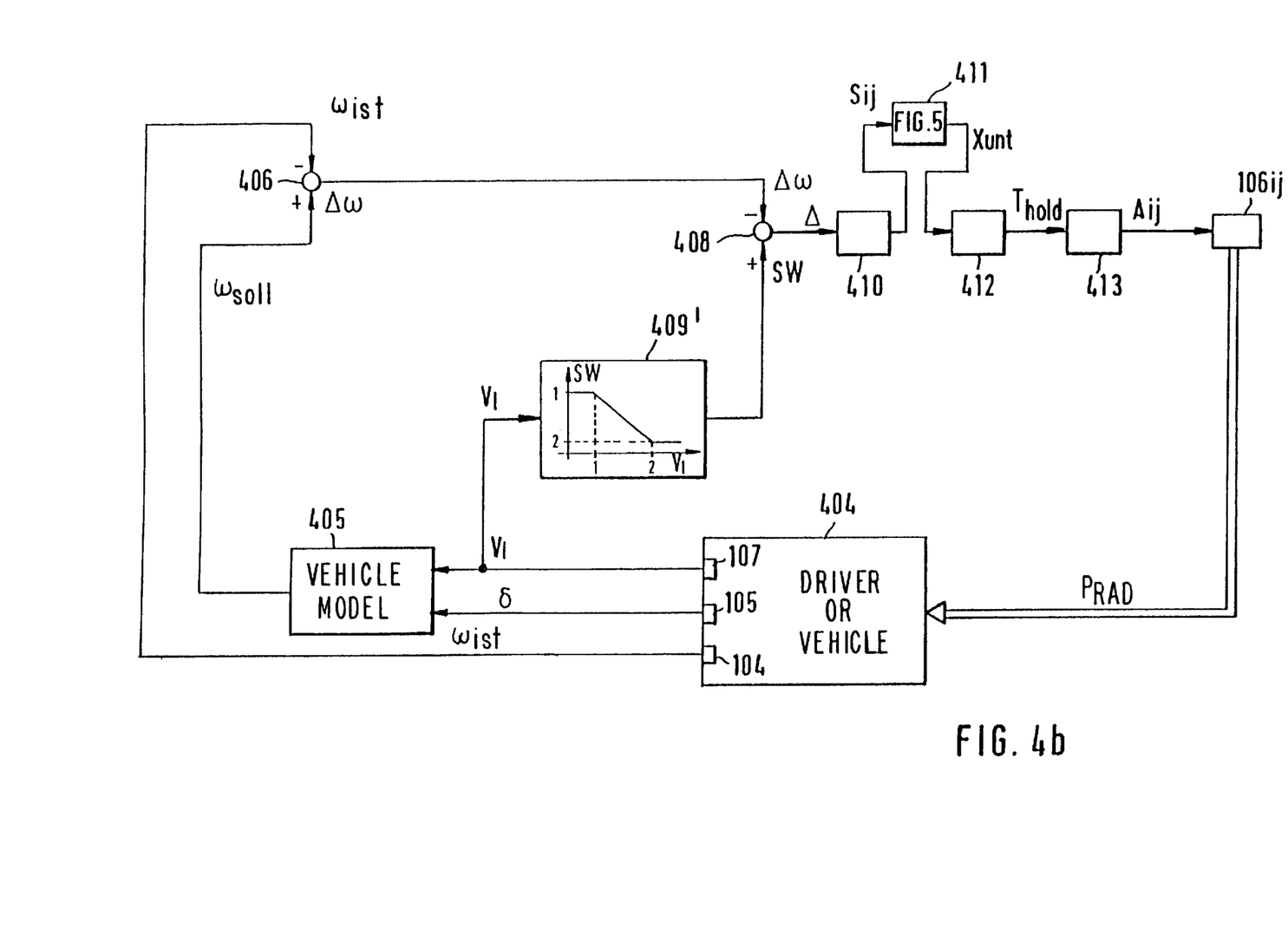

The way in which the overriding driving dynamics controller works, which is known in and of itself from the DE 44 46 592, is only briefly described here on the basis of FIGS. 4a and 4b in connection with this exemplary embodiment. The point which is essential to the present invention is that the overriding driving dynamics controller 101 transmits the wheel intervention signals $S_{ij}$ to a subordinate antilock controller 102. Wheel intervention signals $S_{ij}$ indicate the degree to which wheel $_{ij}$ in question should be underbraked or overbraked. To calculate these brake intervention signals $S_{ij}$ the signals $T_{ij}$ from subordinate antilock controller 102 are transmitted to overriding driving dynamics controller 101. Signals $T_{ij}$ represent the actuation times for the magnetic valves at the wheels for building up or releasing the wheel brake pressure. Overriding driving dynamics controller 101 thus obtains a measure of the instantaneous dynamic behavior of the wheels.

Subordinate antilock controller 102 is designed in a manner known in and of itself to convert the wheel rpm signals or wheel rotational velocity signals $V_{ij}$ (from sensors $103_{ij}$) to actuation signals $A_{ij}$ for wheel brake systems $106_{ij}$. For this purpose, as will be described below in greater detail, an instability value is formed from the wheel velocity signals, and when this instability value exceeds certain thresholds the wheel brake pressure is increased or decreased at the wheel in question.

Figure 2:
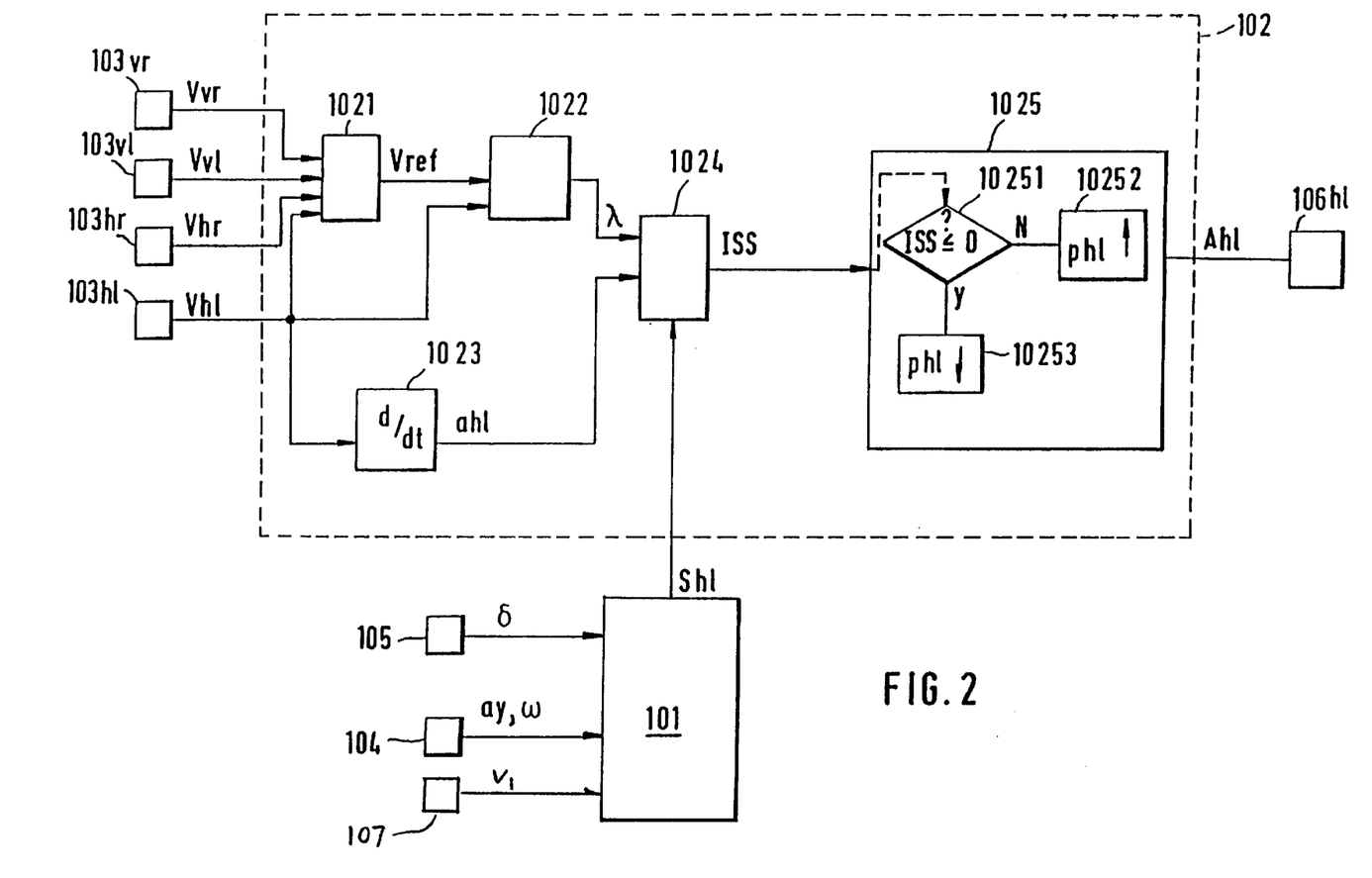
FIG. 2 is block diagram according to the invention.

FIG. 2 shows the design of subordinate antilock controller 102 in greater detail. The rotational velocity signals $V_{ij}$ of the wheels are first sent to unit 1021. Here a reference velocity $V_{ref}$ is formed in a manner known in and of itself from the rotational velocity signals of the wheels; this reference value represents the longitudinal velocity of the vehicle. In FIG. 2, the exemplary embodiment in question will be described on the basis of a braking intervention in the brake at the left rear wheel. For this purpose, the rotational velocity $V_{hl}$ of the left rear wheel is sent to a differentiator 1023, where the associated wheel acceleration $a_{hl}$ is formed. In addition, the rotational velocity $V_{hl}$ is also sent to block 1022, where the wheel slip λ is determined by means of the relationship known in and of itself between the rotational velocity and the vehicle reference velocity $V_{ref}$. For this purpose, the difference $(V_{ref}-V_{hl})$ between the reference velocity of the vehicle and the rotational velocity of the wheel is found and divided by the reference velocity. The wheel slip λ and the wheel acceleration $a_{hl}$ are sent to block 1024. In addition, the wheel brake intervention signal $S_{ij}$ from overriding driving dynamics controller 101 is also sent as input to block 1024.

The goal of driving dynamics controller 101 is to ensure safe driving conditions by calculating a driving behavior derived from the driver's command (steering angle δ, the longitudinal velocity of the vehicle $V_1$) or calculated from a model of the vehicle. As a measure of this driving behavior, the nominal yaw moment or the nominal angular yaw velocity is usually calculated. The driving behavior or yaw moment can., depending on the calculated driving behavior, have a direction which is opposite that of the turning motion of the vehicle or a direction which intensifies the already existing rotation. In driving dynamics controller 101, the calculated driving behavior mentioned is compared with the one actually existing at the moment, as represented by, for example, the current angular yaw velocity ω or the transverse acceleration ay from sensor 104. As a function of this comparison, the wheel brake intervention signals $S_{ij}$ are formed in such a way that the desired driving behavior is produced by interventions in the wheel brakes.

In a conventional antilock control system, block 1024 shown in FIG. 2 can be designed so that an instability value ISS is formed according to the formula:

$$ISS = K1 \cdot a_{hl} + K2 \cdot \lambda + K3 \cdot ARS$$

where the values K1, K2, and K3 are amplification factors, and where the value ARS is an offset for the actuation threshold. Essentially what happens is that the instability value thus formed is used to test the instability conditions in the normal ABS control, which defines the working point for a normal antilock control. Thus there are two ranges to be distinguished:

ISS≦0: wheel is unstable; decrease brake pressure.

ISS>0: wheel is stable; increase brake pressure.

The wheel deceleration $a_{hl}$ and the brake slip λ enter into the calculation as negative Values. Calculation ot an instability value is also described in U.S. Pat. No. 5,332,299.

At this point, it should be pointed out again that the exemplary embodiment described here demonstrates the invention on the basis of a brake intervention at the brake of the left rear wheel (index: "hl"). Similar circuitry is provided for the brakes at the other wheels.

In addition, it should be pointed out that the above-described calculation of the instability value represents only one of many possibilities. Especially in the case of brake and/or propulsion controllers which operate on the basis of torque, the instability value to be modified for the purpose of the invention can represent a wheel moment (torque).

The realization of the wheel brake interventions $S_{ij}$ of overriding driving dynamics controller 101 requires the possibility of modulating the brake forces at the individual wheels in the algorithm of the subordinate antilock controller 102 (block 1024). In conjunction with the above-mentioned algorithm known in and of itself for determining the instability value TIS, the slip λ within the instability value ISS is modified according to the invention as a function of the wheel intervention signal $S_{ij}$. In addition to the wheel slip, of course, the value $a_{hl}$ for the wheel acceleration can also be modified as a function of the intervention signals $S_{ij}$. A conventional antilock controller, however, is organized hierarchically in such a way that it is more advantageous to modify the wheel slip. It is also possible, of course, to modify the offset value.

If, for example, overriding driving dynamics controller 101 detects stable driving behavior, the wheel intervention signals $S_{ij}$, specifically here the signal $S_{hl}$, will have a value of zero. In block 1024, the instability value ISS will then be formed in accordance with the conventional ABS algorithm. If now, for reasons of stability, the braking force is to be increased at the left rear wheel, for example, if the left rear wheel is to be overbraked, the brake slip value existing at that moment is lowered, which leads to an increase in the instability value ISS. This has the result of making the wheel in question appear to have greater stability than it actually has, whereupon the antilock controller increases the wheel braking pressure at this wheel even more.

In block 1205. as already mentioned, the instability value ISS in step 10251 is compared with the threshold value of zero. If the instability value is below the threshold value zero, then in step 10253 the brake pressure is reduced, whereas, if the instability value exceeds the threshold in step 10252, the braking pressure is increased. The decrease or increase in the braking pressure is achieved by the actuation of wheel brake $106_{hl}$ by means of actuation signal $A_{hl}$.

Figure 3:
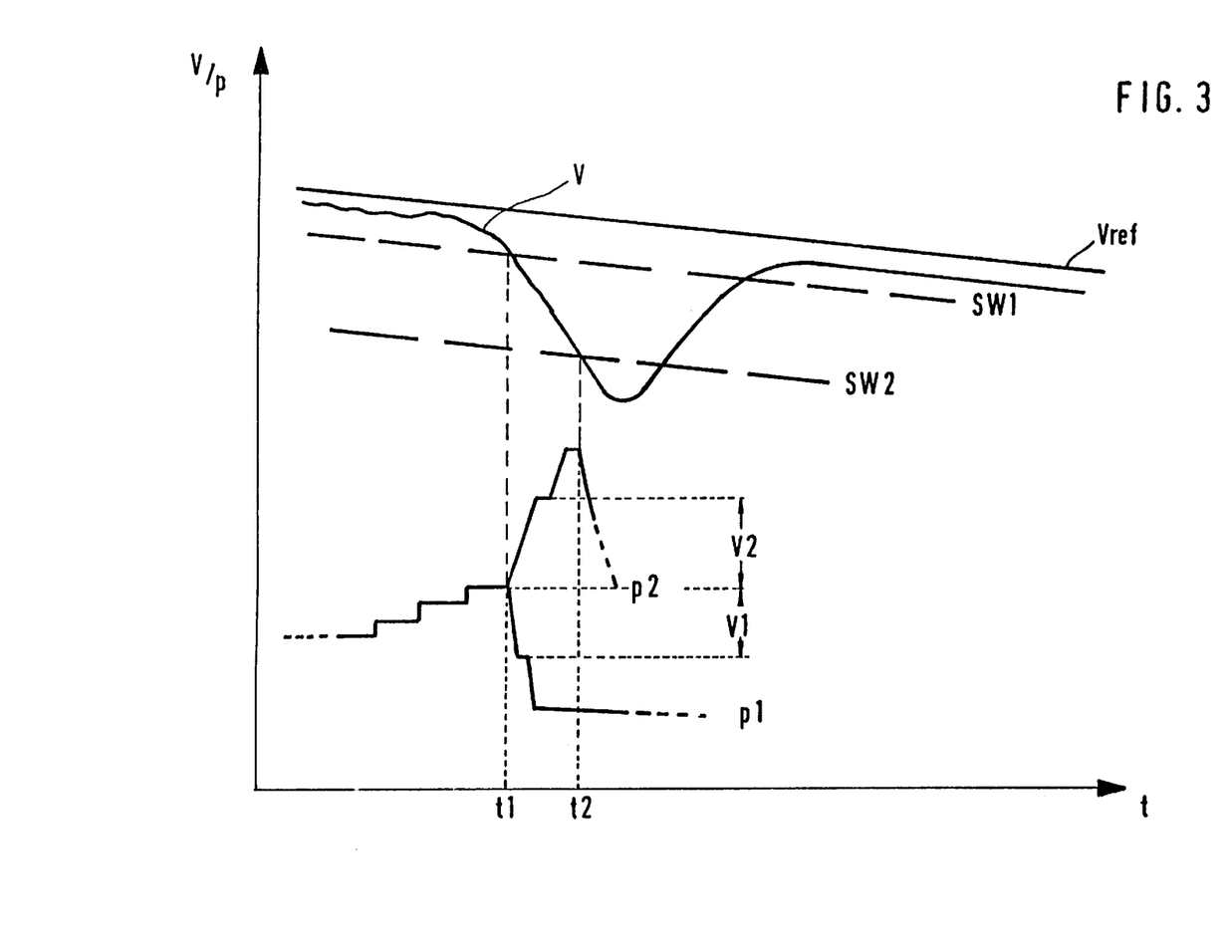
FIG. 3 shows the change over time in the wheel velocity and in the brake pressure.

FIG. 3 shows by way of example the function of the design illustrated in FIG. 2. The upper part of FIG. 3 shows how the vehicle reference velocity $V_{ref}$ and the wheel rotational velocity $V_{Rad}$ (of, for example, the left rear wheel $V_{hl}$) change over time. The lower part of the figure shows how the pressure changes over time; pressure curve $p_1$ is the curve in the normal antilock control case; whereas pressure curve $p_2$ is the curve for the case in which overriding driving dynamics controller 101 initiates a wheel brake intervention at the wheel in question.

In the normal antilock control case, that is, without a wheel brake intervention signal $S_{ij}$, the above-mentioned instability value ISS is below the threshold value of zero at time $t_1$, whereupon a pressure reduction occurs in pressure curve $p_1$. The point at which the instability value below the threshold value of 0 is characterized in FIG. 3 by threshold value $SW_1$. If now, to optimize the driving stability, the wheel in question is to be overbraked, then, in the process of forming the above-mentioned instability value ISS, a slip offset depending on the vehicle instability or on the intervention signal $S_{ij}$ is superimposed on the wheel slip λ formed from the wheel velocity and the reference velocity. This leads first to a change in the instability value such that, at time $t_1$, the instability value ISS still exceeds the threshold value of zero. This leads to another increase in pressure beyond time $t_1$ until ultimately the instability value ISS thus modified falls below zero at time $t_2$. At this point, as can be seen from the course of pressure curve $p_2$, the brake pressure is decreased. In FIG. 3, this is shown by threshold value $SW_2$.

According to the invention, therefore, the conventionally designed subordinate antilock controller is left unchanged; the only difference is that, in the formation of the instability value, the instantaneous wheel slip value is changed in such a way that the brake pressure is reduced either earlier or later than in the normal ABS case.

It can be seen in FIG. 3 that, in a manner known in and of itself, the brake pressure is built up and released in pulses. This means that the brake pressure is built up and released in predefinable stages, these stages being separated by predefinable hold times. As can be seen in FIG. 3, in the presence of a wheel intervention signal $S_{ij}$ the height of the stage, that is, the value of amplification factor $V_2$, is selected differently from the amplification factor $V_1$ in the normal ABS case. In the case of an active driving dynamics intervention $S_{ij}$, therefore, the amplification factor for the pressure stages in the ABS pulse sequence is increased. This offers the advantage that the overbraking of the wheel shown in FIG. 3 to stabilize the vehicle proceeds as quickly as possible.

If driving dynamics controller 101 has transmitted a command signal $S_{ij}$ to underbrake a wheel ij, then the control threshold, that is, the threshold at which the brake pressure is lowered, is set to a more sensitive level by the modification of the instability value ISS. As a result, the subordinate antilock controller 102 concludes from the negative instability value that the wheel is apparently unstable, whereupon the pressure is reduced as part of the ABS pressure release logic. This pressure release, as shown in FIG. 3, is also processed in the form of pulse-pause sequences. When overriding driving dynamics controller 101 transmits a wheel brake intervention signal $S_{ij}$, these pulse-pause times are modified in correspondence with the requirements imposed by driving dynamics controller 101.

Two design variants are now to be presented on the basis of FIGS. 4a and 4b. By means of these variants, the above-mentioned driving dynamics brake intervention can be adjusted optimally to the actual driving situation. As previously mentioned, individual wheels ij are overbraked or underbraked for certain periods of time to obey the commands $S_{ij}$ of overriding driving dynamics controller 101. To make it easier to understand the two design variants shown in FIGS. 4a and 4b, the formation of the brake intervention signals $S_{ij}$ in driving dynamics controller 101 will be discussed briefly. In FIGS. 4a and 4b, the blocks with the same functions as the blocks in the preceding figures are designated with the same reference numbers.

In FIGS. 4a and 4b, the system "driver" or "vehicle" is marked with reference number 404. In the manner already described, the longitudinal velocity $V_1$ of the vehicle is detected by sensor 107, the steering angle $\delta v$ of the vehicle by sensor 105, and the yaw velocity $\omega_{ist}$ of the vehicle by sensor 104 as system data. By means of vehicle model 405, a nominal yaw velocity $\omega_{soll}$ is formed in a manner known in itself from the longitudinal velocity $V_1$ of the vehicle and the instantaneous steering angles; this value $\omega_{soll}$ is then compared at junction 406 with the actual value $\omega_{ist}$ for the yaw velocity. The difference $\Delta\omega$ between the actual and nominal values for the angular yaw velocity is linked in the situation recognition unit with the wheel dynamics existing at the time, whereupon a stability value $fzstab_{ist}$ is calculated. So that situation recognition unit can determine the instantaneous wheel dynamics, it is sent the instantaneous wheel brake pressures $P_{RAD}$. These wheel brake pressures can be measured directly or estimated from other variables. From the longitudinal velocity of the vehicle, a corresponding nominal value $fzstab_{soll}$ for the above-mentioned stability value is calculated in block 409 and compared in comparison stage 408 with the actual value. The nominal stability value $fzstab_{soll}$ decreases with increasing vehicle longitudinal velocity $V_1$. The deviation $\Delta fzstab$ is made available on the output side of comparator 408.

FIG. 4b shows a variant in which situation recognition unit 407 is omitted, and the angular yaw velocity $\Delta\omega$ is compared directly in comparator 408 with a corresponding vehicle longitudinal velocity-dependent threshold value SW to obtain the deviation $\Delta$.

Figure 5:
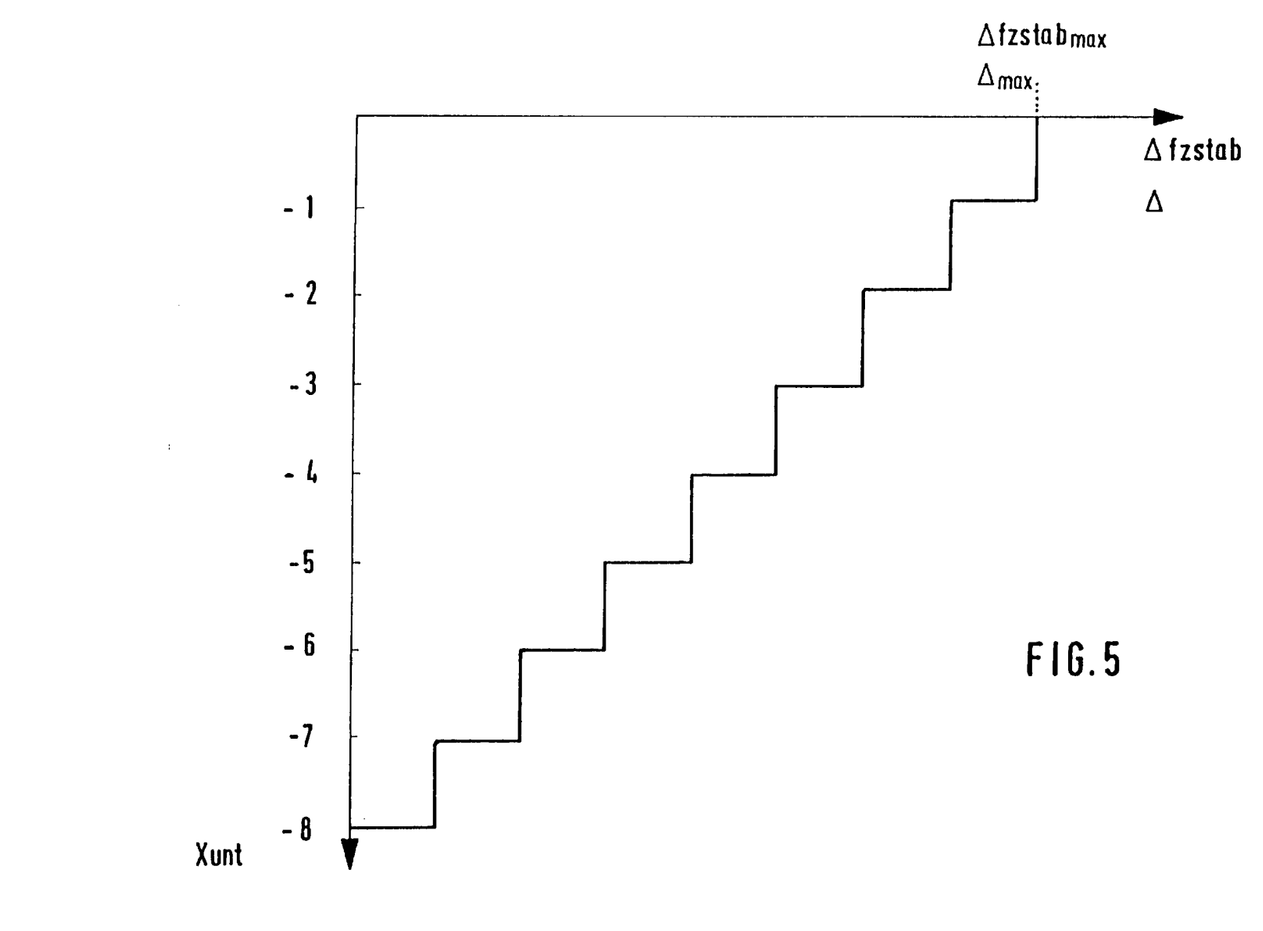
FIG. 5 shows the dynamic systems behavior of an individual block.

The deviation $\Delta fzstab$ or $\Delta$ is sent to block 410, where the brake intervention signals $S_{ij}$ for the individual wheel brakes are formed from the deviation in a manner known in and of itself. In this exemplary embodiment, it will be assumed that wheel ij is to be underbraked to lower the instantaneous braking pressure level. The degree of underbraking intervention $X_{unt}$ is obtained in block 411 from the normalization of the deviation $\Delta fzstab$ or $\Delta$ and is represented as a signed, 4-bit value in the number range of $-8 \leq X_{unt} < -1$. This can be seen in FIG. 5. The value $X_{unt}$ is sent to block 412, where the braking pressure hold time $T_{hold}$ for the above-mentioned pulse-like or step-like brake pressure feed or brake pressure release is calculated according to the following formula:

$$T_{hold} = M*(8-|X_{unt}|) + T_{min}$$

The pressure hold time $T_{hold}$ is modified by the parameters for the slope of the line M and the minimum hold time $T_{min}$. The hold time $T_{hold}$ thus obtained is converted in block 413 under consideration of the pulse level control of the braking pressure to corresponding actuation signals $A_{ij}$ for wheel brake $106_{ij}$.

As a result of the procedure illustrated on the basis of FIGS. 4a, 5b, and 5, it is achieved that, in an underbraking intervention, the release gradients of the brake pressure are represented as variable pulse-pause sequences, functionally dependent on the deviation $\Delta fzstab$ or $\Delta$. The dynamic systems behavior of block 411 shown in FIG. 5 can be set up in a more complicated form, of course, as a characteristic diagram. The essential feature of this design variant of the invention is that, when an intervention is to be made in the brakes for the sake of driving stability, the gradient of the change in brake pressure is linked with the driving stability deviation in such a way that, when the deviation is relatively large (low driving stability), the brake pressure is changed relatively quickly.

If now driving dynamics controller 101 is to break off the underbraking intervention ($X_{unt}=0$), the wheel brake pressure must be brought back again to the locking pressure level existing at that moment by a change in pressure dP. This is done, first, by the calculation of the required total pressure buildup time P100 on the basis of the pressure release times which occurred during the underbraking intervention and, second, by the evaluation of the current wheel-specific instability value $ISS_{akt}$ relative to the instability value $ISS_{start}$ at the beginning of the transition phase, that is, at the beginning of the driving dynamics intervention. The current wheel-specific instability value $ISS_{akt}$ corresponds to the instability value from the base antilock control algorithm and is defined as positive for a wheel which is operating stably and as negative for wheel which is operating unstably. This relationship can be described by the following formulas:

$$0 < ISS_{akt} \leq ISS_{start}$$

$$dP = P100 * ISS_{akt}/ISS_{start} * Kv$$

(with amplification factor Kv: $0 < Kv \leq 1$).

In the range where $ISS_{akt}$ is valid, this relationship leads to a digressive increase in the wheel brake pressure as a result of the decrease in the positive wheel slip and the increase in the wheel deceleration and to stable control behavior as a result of the proportional-differential (PD) rule of the instability criterion.

The pressure buildup following the pressure reduction can, in addition to its dependence on the current generated instability value $ISS_{akt}$ and on the instability value $ISSS_{start}$ generated at the beginning of the modification of the instability value, also depend on the difference between the higher pressure level $p_{hoch}$ and the lower pressure level $p_{tief}$. It is assumed here that, through the modification according to the invention of the instability value ISS belonging to a wheel, the brake pressure at this wheel is reduced from the higher pressure level $p_{hoch}$ to the lower pressure level $p_{tief}$ (underbraking of a wheel) even though there is no indication of locking and no indication of a tendency to lock.

Figure 6A:
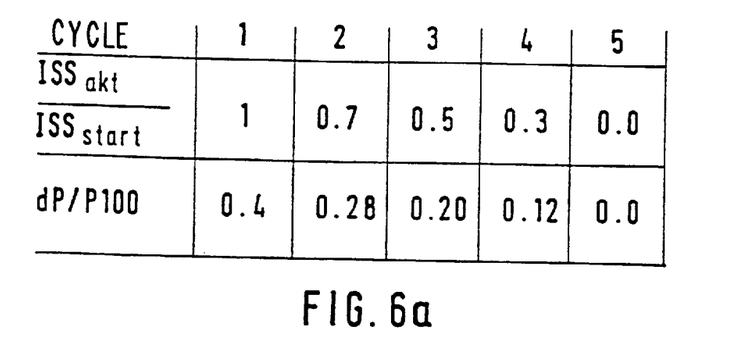
FIG. 6a presents a table.
Figure 6B:
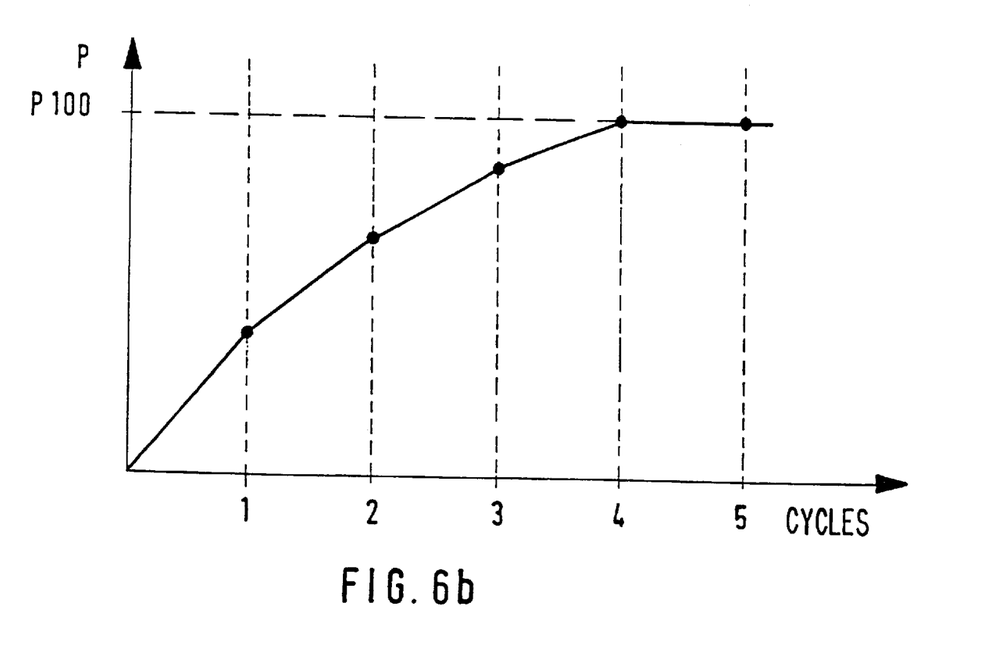
FIG. 6b shows a plot of the values in the table.

FIG. 6a (Table) and FIG. 6b (curve) are intended to clarify the main function of the transition behavior according to the invention for selected values of $ISS_{akt}$ and for Kv=0.4.

If a wheel is to be overbraked beyond the locking pressure level to reduce the lateral force, then, in correspondence with the deviation $\Delta fzstab$ or $\Delta$ (FIGS. 4a and 4b) of driving dynamics controller 101, a positive slip offset is added during the calculation of the instability value $ISS_{akt}$. This has the result of compensating for negative values of $ISS_{akt}$, which normally lead to a pressure reduction. The raising of the wheel pressure level leads to an increase in the amount of wheel slip and thus to a decrease in the lateral force. The wheel pressure is adjusted to the desired value in the same way as in the underbraking situation described above. The variants described on the basis of FIGS. 4a, 4b, 5, 6a, and 6b have the advantage that a base application of subordinate antilock controller 102 does not have to be modified to realize the wheel brake interventions $S_{ij}$ of the overriding driving dynamics controller 101.

We claim:

1. System for actuating the brakes of at least one wheel of a vehicle, said system comprising detection means for detecting at least one variable representing wheel motion, detection means for detecting vehicle state variables comprising steering angle δ and at least one of vehicle longitudinal velocity $v_1$, transverse acceleration ay and yaw velocity ω, calculation means for calculating a driving dynamics variable (Δω, $fzstab_{ist}$) based on said vehicle state variables, which driving dynamics variable represents the driving dynamics of the vehicle, generation means for generating an instability value ISS based on at least one of said variables representing wheel motion and said driving dynamics variable, and actuation means for changing the brake pressure as a function of the instability value.

2. Method for actuating the brakes of at least one wheel of a vehicle, said method comprising detecting at least one variable representing wheel motion, detecting vehicle state variables comprising steering angle δ and at least one of vehicle longitudinal velocity $v_1$, transverse acceleration ay, and yaw velocity ω, calculating a driving dynamics variable (Δω, $fzstab_{ist}$) based on said vehicle state variables, which driving dynamics variable represents the driving dynamics of the vehicle, generating an instability value ISS based on at least one of said variables representing wheel motion and said driving dynamics variable, and changing the brake pressure as a function of the instability value.

3. Method as in claim 2 comprising deriving at least two dynamic wheel values (λ, $a_{ij}$) from at least one of said variables representing wheel motion, modifying at least one of said dynamic wheel values (λ, $a_{ij}$) as a function of said driving dynamics variable (Δω, $fzstab_{ist}$), generating said instability value as a function of said dynamic wheel values (λ, $a_{ij}$) as modified by said driving dynamics variables.

4. System for actuating the brake systems ($106_{ij}$) of at least one wheel of a vehicle with detection means ($103_{ij}$) for detecting at least one variable ($N_{ij}$) representing the motions of the wheel;

generation means (1024) for generating an instability value (ISS) for at least one wheel, derived from the detected variables; and actuation means (1025) for changing the brake pressure as a function of the generated instability value (ISS); and determination means (104, 105, 101) for determining a variable (ay/ω, δ, Δω, $fzstab_{ist}$) which represents or modifies the driving dynamics of the vehicle, wherein the generation means (1024) are designed in such a way that the instability value (ISS) can be modified as a function of the determined variable (ay/(ω, δ, Δω, $fzstabi_{ist}$).

5. System according to claim 4, wherein, in the case where the instability value (ISS) is modified, the gradient of the change in brake pressure is selected differently from the case where the instability value (ISS) is not modified.

6. System according to claim 4, wherein the changes in brake pressure are implemented in stages by means of pre-definable pressure buildup and/or pressure release pulses separated by pre-definable pressure hold phases ($T_{hold}$).

7. System according to claim 4, wherein the generation means (1024) derives at least two dynamic wheel values (λ, $a_{ij}$) from the detected variables ($N_{ij}$) for generating the instability value (ISS), and wherein at least one of these dynamic wheel values can be modified as a function of the calculated variable (ay/ω, δ, Δω, $fzstab_{ist}$).

8. System according to claim 7, wherein a value (λ) representing the wheel slip is determined from the detected variables ($N_{ij}$) representing the wheel motions, and wherein this determined value (λ) can be modified as a function of the determined variable (ay/ω, δ, Δω, $fzstab_{ist}$) which modifies and/or represents the driving dynamics of the vehicle.

9. System according to claim 4, wherein the magnitude of the instability value (ISS) unmodified by the determined variable (ay/ω, δ, Δω, $fzstab_{ist}$) indicates whether the associated wheel has an instability comprising locking or a tendency to lock.

10. System according to claim 9, wherein in the case where the instability value (ISS) is modified, the gradient of the change in brake pressure is selected as a function of the degree to which the instability value (ISS) is modified.

11. System according to claim 9, wherein as a result of the modification of the instability value (ISS) belonging to a wheel, the brake pressure at this wheel can be changed in such a way that, even though there is no indication of locking and loo indication of a tendency to lock, the brake pressure is increased (overbraking of a wheel).

12. System according to claim 9, wherein, as a result of the modification of the instability value (ISS) belonging to a wheel, the brake pressure at this wheel can be changed in such a way that, even though there is no indication of locking and no indication of a tendency to lock, the brake pressure is lowered from a higher pressure level ($P_{hoch}$) to a lower pressure level ($p_{tief}$) (underbraking of a wheel).

13. System according to claim 12, wherein the pressure buildup following the pressure reduction is carried out as a function of at least one of the following:

an instability value ($ISS_{akt}$) currently being generated, an instability value ($ISS_{start}$) generated at the beginning of the modification of the instability value, and the difference between the higher pressure level ($P_{hoch}$) and the lower pressure level ($P_{tief}$).

14. System according to claim 13, wherein the calculation means (104, 105, 101) are also designed to calculate at least one threshold value (SW, $fzstab_{soll}$) for the calculated variable (ay/(Δ, δ, Δω, $fzstab_{ist}$) which modifies and/or represents the driving dynamics of the vehicle, and wherein the pressure hold phases ($T_{hold}$) are pre-defined as a function of the extent of the deviation between the calculated threshold value and the calculated variable.

* * * * *

UNITED STATES PATENT AND TRADEMARK OFFICE
CERTIFICATE OF CORRECTION

PATENT NO. : 6,052,641  
DATED : April 18, 2000  
INVENTOR(S) : Wuerth et al.

Page 1 of 1

It is certified that error appears in the above-identified patent and that said Letters Patent is hereby corrected as shown below:

Column 3,  
Line 9, change "preselectable" to -- pre-selectable --.  
Line 48, change "u" to -- ω --.

Column 4,  
Line 23, after "thresholds" insert a comma.  
Line 54, after "can" delete a period.

Column 5,  
Line 1, after "k2•" insert -- λ --.  
Line 10, change "≤" to -- ≤ --.  
Line 13, change "ot" to -- of --.  
Line 32, change "TIS" to -- ISS --.  
Line 40, after "value" insert -- falls --.

Column 7,  
Line 19, after "unit" insert -- ARS --.  
Line 43, change "≤" to -- ≤ --.

Column 8,  
Line 22, change "≤" to -- ≤ --.  
Line 25, change "≤" to -- ≤ --.  
Line 34, change "ISSS" to -- ISS --.

Column 10,  
Line 51, change "ay/Δ" to -- ay/ω --.

Signed and Sealed this

Seventh Day of August, 2001

*Attest:*

*Attesting Officer*

NICHOLAS P. GODICI  
*Acting Director of the United States Patent and Trademark Office*